United States Patent

[11] 3,575,157

[72] Inventor Alfred Whittel, Jr.
 Los Angeles, Calif.
[21] Appl. No. 56,
[22] Filed July 8, 1970
[45] Patented Apr. 20, 1971
[73] Assignee Raypak Company Inc.
 El Monte, Calif.
 Continuation of application Ser. No.
 866,134, Oct. 9, 1969, which is a
 continuation of application Ser. No.
 711,406, Mar. 7, 1968.

[54] HOT WATER HEATING SYSTEM FOR PROVIDING HOT RINSE WATER AT UNIFORM TEMPERATURE
 17 Claims, 4 Drawing Figs.

[52] U.S. Cl. ............................................ 126/362
[51] Int. Cl. ........................................... A47l 15/00,
 F24h 1/18, F24h 9/20
[50] Field of Search ..................................... 126/362;
 237/B.P, 8, 19, 63; 165/39; 122/406

[56] References Cited
 UNITED STATES PATENTS

| | | | |
|---|---|---|---|
| 1,731,368 | 10/1929 | Baker | 126/362X |
| 2,557,369 | 6/1951 | Broderick | 237/8 |
| 2,833,273 | 5/1958 | Miller | 126/362 |
| 3,111,942 | 11/1963 | Miller | 126/362 |
| 3,171,387 | 3/1965 | Muller | 237/19X |
| 3,229,683 | 1/1966 | Russell et al. | 126/362 |
| 3,276,517 | 10/1966 | Lowe | 165/39 |
| 3,349,755 | 10/1967 | Miller | 122/406 |

Primary Examiner—Charles J. Myhre
Attorney—Herzig and Walsh

ABSTRACT: The invention is in the field of hot water heating and supply systems constructed to be able to supply hot rinse water at a temperature of, for example, 180° to 205° F. for the duration of relatively short but rapid draws, while maintaining this temperature. An accumulator tank of limited volumetric capacity is provided with a primary circulation loop between the lower part of the tank and the heater. The accumulator tank supplies a distribution loop including a dishwasher which is to be supplied with hot rinse water for sanitation purposes, at a temperature to be maintained in a range, for example, of 180° to 205° F. Makeup cold water is supplied from a city water line. A circulator provides for continuous circulation in the primary loop and when there is a draw of hot rinse water, cold water feeds in from the city water line. The heat source is modulated by thermostatic means responsive to the temperature of the incoming water to the heater. The heat source is capable of being modulated over a range adequate to meet load requirements so that in the event of a draw of hot rinse water, this is quickly sensed by the cold water entering the heater, causing immediate response by the thermostatic means so that the temperature in the accumulator tank is effectively maintained during the draw.

PATENTED APR 20 1971 3,575,157
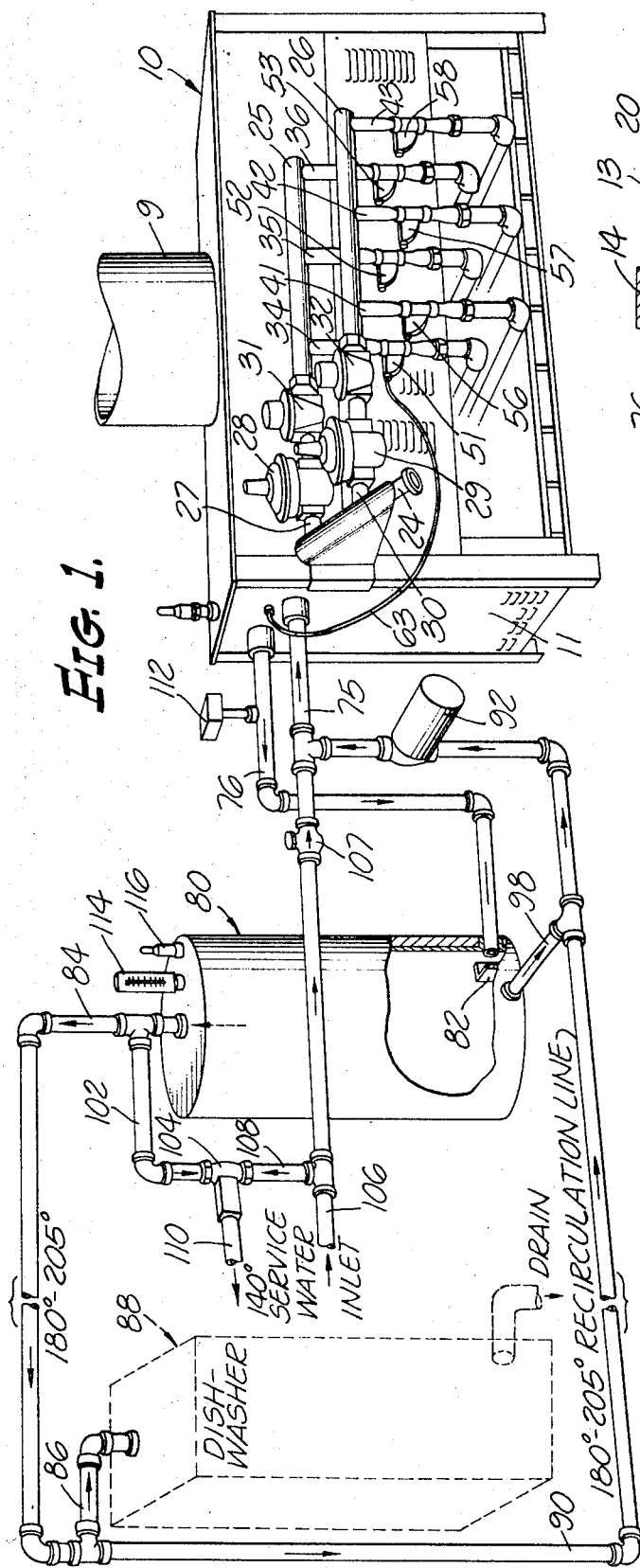
Fig. 1.
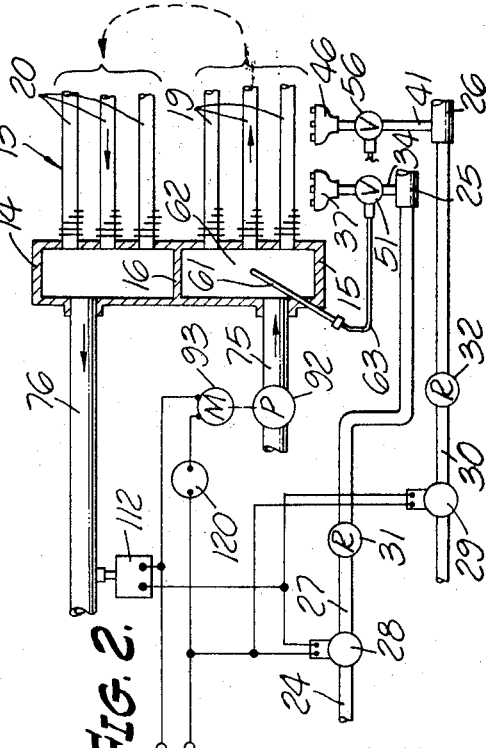
Fig. 2.
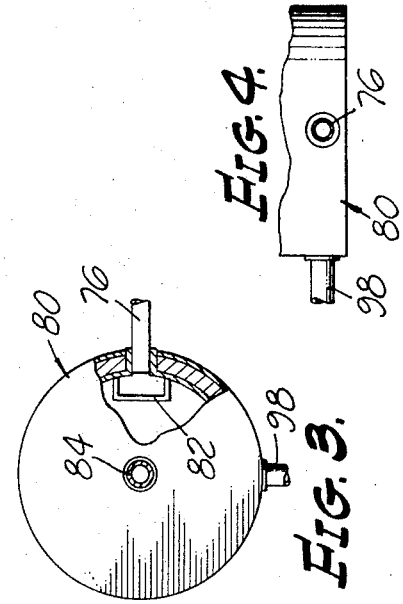
Fig. 3.
Fig. 4.
INVENTOR
ALFRED WHITTELL, JR.
BY
Herzig, Walsh & Blackham
ATTORNEYS

HOT WATER HEATING SYSTEM FOR PROVIDING HOT RINSE WATER AT UNIFORM TEMPERATURE

This application is a continuation of Ser. No. 866,134, filed Oct. 9, 1969 which in turn is a continuation of Ser. No. 711,406 filed Mar. 7, 1968.

SUMMARY OF THE INVENTION

This invention relates generally to water heaters for supplying heated water and more particularly to commercial installations adapted for use in restaurants and the like.

In applications of this type, it is necessary to be able to provide hot sanitizing rinse water for use in automatic dishwashers at a temperature in the range of 180° to 205°, for example. Of course, at the same time, it is necessary to be able to supply water at lower temperatures, for example, at 140° F. for general uses. To accomplish these purposes has been found to be very difficult, and particularly to provide equipment that would stand up when meeting this rigorous service.

Storage-type heaters are not suitable for this application as is well known and acknowledged in the prior art for various reasons. To attempt to solve the problem by heating the water to somewhat above 180° so that incoming cooling water, which results when there is a draw of hot water, will not bring the temperature below 180° is also unsatisfactory. This is true because it gives rise to a problem, such as the formation of excessive lime deposits and the danger of producing live steam; stratification of the water; relief valve blowoff; and similar discharges.

Modern municipal health department requirements ordinarily call for water for this purpose at not less than 180° in dishwashing and rinsing operations to ensure sanitization. This requirement has often made necessary the installation of completely separate water heating systems in restaurants in order to satisfy the intermittent demands of the dishwashers and similar equipment.

In the light of the foregoing, it is a basic objective of the invention to provide simplified, but economical and highly effective hot water heating and supply systems capable of meeting the requirements as set forth in the foregoing; that is, being able to steadily supply warm water at a temperature of 140° and to be able to supply water at a higher temperature 180° or higher without loss of temperature.

Another object is to provide a system which can meet the foregoing object without giving rise to additional problems and without the need of a large storage tank.

Another object is to provide a system which will meet the stated basic requirements and which is characterized in that with a relatively small accumulator tank for hot water in the primary loop of the system wherein a heat source is provided and so controlled as to be able to quickly sense a draw of hot water and to then adjust the heating rate to be able to supply the demand so as to maintain the desired higher temperature of the water without loss during the periods of draw of this water.

A further object is to provide a system having the characteristics as set forth wherein there is a primary circulation loop between the heater or boiler and an accumulator tank in which circulation is constantly maintained, the heat source being a modulated type responsive to thermostatic means which in turn are responsive to the inlet water entering the heater, the accumulator tank being connected to a distribution loop including a part to which the relatively high temperature water is supplied with a city water line connecting the supply of makeup water at the inlet to the heater, whereby upon a draw of relatively high temperature water the load is immediately sensed by the entering cold water into the heater, bringing about quick response and ability to hold a relatively high temperature in the accumulator.

Along with realization of the foregoing objectives, the herein invention achieves various other advantages. Even with temperature losses in water lines, the herein system can hold the temperature at 180° or over. Thus flexibility of location of the dishwasher is possible; it can be located anywhere.

The system is adapted to use with rack-type or conveyor-type dishwashers as will be understood from the ensuing description. With rack-type washers the accumulator makes it possible to maintain more precise temperatures by way of a reduced modulating control differential. During short intermittent water draws, temperature variations can be held to 3½° F.

Further objects and additional advantages of the invention will become apparent from the following detailed description and annexed drawings, wherein:

FIG. 1 is a diagrammatic view of the preferred form of the system;

FIG. 2 is a diagrammatic view of a part of the system illustrating the control arrangement;

FIG. 3 is a plan view of the accumulator tank partly broken away; and

FIG. 4 is a side view of the lower part of the accumulator tank.

Control of the heat source of the system is similar to and has characteristics comparable to those of the system described in the previous application Ser. No. 558,362, filed July 17, 1966, now abandoned. Also in the system of this invention for controlling the temperature in that part of the distribution loop to which the warm water at a temperature of, for example, 140° F. is supplied, a three-way mixing valve is utilized similar to the arrangement shown in earlier application Ser. No. 605,348, filed Dec. 28, 1966, now U.S. Pat. No. 3,413,969.

FIGS. 1 and 2 illustrate a preferred exemplary form of the invention embodied in a hot water heating system for supplying hot water for any of various purposes, such as domestic and industrial uses, but more particularly for use in a facility requiring sanitizing water at a temperature of, for example, in the range of 180° to 205° is required.

In FIG. 1 numeral 10 designates generally the heater or boiler unit. As shown, it is in the form of a cabinet 11 which may be made of sheet metal or the like, having legs as shown. The cabinet 11 has a cylindrical stack 9 leading from the combustion chamber. The unit in the exemplary form, as shown, is gas-fired, the heat being applied to finned tubes within the unit. The boiler or heat exchanger unit is designated generally at 13 in FIG. 2. It comprises inlet and outlet headers 14 and 15 which may be formed from massive bronze castings with a partition 16 therein separating the inlet from the outlet. The inlet and outlet headers connect to a header at the opposite end by way of finned tubes forming a first pass 19 and a second pass 20. The arrows designate the path of flow of water. The tubes and headers may be of conventional construction, such as to provide for efficient heat transfer and water circulation. The unit 13 is, of course, mounted in the upper part of the cabinet 11. In the form of the invention shown, heat is supplied by gas burners in the cabinet 11 in the combustion chamber below the unit 13. Gas is supplied through an inlet supply pipe 24 to a pair of gas manifolds 25 and 26. In the pipe 27 connecting to manifold 25 is an electric gas valve 28 and in the pipe 30 connecting to the manifold 26 is an electric gas valve 29. Also provided are the gas pressure regulator valves 31 and 32 shown in FIG. 1.

Manifold 25 is connected to pipes 34, 35 and 36 leading to a group of gas burner heads, one of which is shown at 37 in FIG. 2. Manifold 26 is connected to a group of pipes 41, 42 and 43 which connect to a group of burner heads, one of which is shown at 46 in FIG. 2. In the pipes 34, 35 and 36 are thermostatically-controlled throttling valves 51, 52 and 53. In the pipes 41, 42 and 43 are thermostatically-controlled throttling valves 56, 57 and 58. Each of the throttling or modulating valves is controlled by a remote thermostatic bulb and tube, the bulb being positioned in a copper well in the inlet header 15. One of these thermostatic bulbs is shown at 61 by way of example, in the well 62 in header 15, which is formed to provide a separate well for each thermostatic bulb to ensure that there is effective and rapid heat transfer to the thermostatic bulbs. The thermostatic tube is shown at 63 for the valve 51.

The control of the main electric valves will be described in more detail presently, as well as the control of the thermostatic throttling valves, and the significance of the position of the thermostatic bulbs as illustrated by the bulb 61 will be pointed more in detail presently.

The heating unit and controls as described so far are similar to that of earlier filed application Ser. No. 558,362, filed June 17, 1966, now abandoned. In the system of the prior application, a bypass loop or connection is provided between the inlet pipe to the heater and the outlet pipe therefrom with a constantly running circulator in it. The herein invention to that extent embodies a similar arrangement.

Numeral 75 designates the inlet water pipe to the heater unit or boiler and numeral 76 designates the outlet pipe. Manually adjustable valves may, of course, be provided in these pipes.

Pipe 76 connects to the lower part of a hot water accumulator tank 80 which is of limited volumetric capacity and in the exemplary system being described, it may have a capacity of, for example, 13 gallons. Positioned above the point at which the line 76 connects to the tank 80 there is provided a baffle member 82 which has a particular configuration designed ordinarily to prevent upward flow within the accumulator 80 except when there is a demand or draw of water from it as will be described. The discharge of supply line from the accumulator tank 80 to the hot water distribution loop is designated at 84, water being supplied to this loop at a temperature in the range of 180° to 205°. This line is shown as having a branch line 86 connecting to a dishwasher 88 requiring water in this temperature range. Beyond the branch 86 the line continues to a recirculation line 90 which connects back to the line 75 which is the inlet to the heater. In this line is a motor-driven circulator or pump 92 which normally runs continuously, the motor being designated at 93 in FIG. 2. Connecting from the bottom of the accumulator tank 80 to the recirculating line 90 is a bypass line or connection 98. From the foregoing it can be observed that the lines 75, 76 and 98 and the end part of the recirculation line form a primary loop with the heater or boiler. During periods when there is no draw of water from the accumulator tank, the circulator 92 is operating and circulation is continuous through this primary loop. The circulator is sized to provide a velocity flow such that the system has characteristics like those of the earlier application referred to. The modulated control of the thermostatic valve is such that heat can always be transferred to the circulating water at a rate sufficient to maintain the temperature and to prevent scaling within the boiler tubes.

The sizing of the circulator is important. By maintaining a velocity flow heat can be transferred much more efficiently and effectively while still holding a narrow control differential and with a unit of smaller size. Additionally the circulator is sized so as to maintain a velocity of flow related to the hardness of the water, which is classified as hard, intermediate, and soft. Depending on the water hardness, a velocity can be maintained which will inhibit or prevent scaling and corrosion and yet will not induce erosion of the interior of the tubes; that is, the erosion can be held within limitations such as not to shorten the life that the tubes would otherwise have. Engineering charts have been prepared from which pump size can be selected. (Water hardness is stated in terms of grains/gallon of calcium carbonate, $CaCO_3$). The size is selected on the basis of data including (1) boiler input required (size); (2) temperature rise; (3) rate of flow to obtain the temperature rise; (4) pressure drop at the determined rate; and (5) pressure drop due to specific piping requirements. Using the foregoing data and prepared charts, the optimum pump size can be readily selected.

Numeral 102 designates the water supply line for warm water at a temperature of, for example, 140° for suitable service in wash bowls and the like. Line 102 connects to a three-way thermostatic mixing valve 104. Numeral 106 designates the city water line in which water may be supplied from the city source at a temperature of perhaps 35° to 60° F. and a pressure of 20 to 40 pounds per square inch. Numeral 107 designates a check valve in line 106. The three-way valve 104 has two inlets and an outlet and connected to the other inlet is a branch line 108 from the line 106 to receive cold water from this line. As may be seen, heated water and cold water enter the three-way valve 104 and these flows are mixed and delivered to the outlet 110 to the distribution loop requiring water at 140°, for example. Within the outlet part of the three-way valve 104 is a thermostatic element and which therefore serves to maintain the temperature of the water delivered to this service line.

Numeral 112 designates a flow switch connected to the line 76 to be in a position to operate whenever there is flow in the primary loop. At the top of the accumulator tank 80 is a thermostat 114 and a pressure-temperature relief member 116. In FIG. 2 numeral 120 designates a manual switch controlling the motor which drives the pump or circulator 92.

Having reference now to the operation of the system, it will be observed that whenever switch 120 is closed and the circulator 92 is operating, there will be flow of water in the primary loop as described, including the bottom of the accumulator tank 80, but there will be no upward circulation in this tank. The flow in the primary loop closes the flow switch 112 which causes the electric valves 28 and 29 to open to supply fuel to the burners. Heat can be transferred to the water at a very high rate under the control of the thermostatic bulbs and the supply of heat meets the requirements of the load, the system in this respect having the desirable characteristics described in the earlier application.

In normal operation, if there is no draw of water from the system, as explained, the circulation takes place only in the primary loop which, if effect, is a bypass between the inlet and outlet lines to the heater or boiler.

The thermostatic controls are set, in the exemplary embodiment, to maintain the temperature at a range of 180° to 205° in the accumulator tank so that this water is always available as sanitizing water. In the event of a draw of water from the loop supplied by the pipe 84, cold water from the city water supply line 106 feeds through the check valve 107 into the line 75 to the inlet of the heater. The thermostatic bulb or bulbs being in the inlet header as described, immediately sense that there has been a draw of water and they respond to increase the heating rate to maintain the load demand and thus maintain the water at the required temperature in the accumulator tank 80. When there is a draw there is an upward flow from the area at the end of the connection to the tank 80 to make up for the water withdrawn. In the exemplary embodiment of the invention, it has been found that the temperature of the water within the accumulator tank can be maintained within 3½° by the system as described, therefore meeting the rigorous demands and requirements wherein it is necessary to be able to supply water at this temperature. The draws are usually at rates of 5 to 10 gallons per minute for periods of 12 to 15 seconds. The system meets this rigorous requirement while at the same time having the very significant advantages and characteristics of the system described in the prior application and these advantages being realized with a heater or boiler which is smaller. In other words, the system successfully accommodates itself to the sudden rapid but short draws of water at the required temperature, while maintaining the temperature. This is accomplished without introducing, or suffering the drawbacks and deficiencies of prior known systems.

The foregoing disclosure is representative of a preferred form of the invention and is to be interpreted in an illustrative rather than a limiting sense, the invention to be accorded the full scope of the claims appended hereto.

I claim:

1. A hot water heating system comprising a heat exchanger having a limited volumetric capacity, a heat source for applying heat to the heat exchanger, a water distribution loop, circulator means for maintaining a flow of water in a primary loop which includes the said heat exchanger and having a bypass relationship with the distribution loop, a source of cold water connected directly to the inlet of the heat exchanger, and means for modulatingly controlling the heat source in response to temperature of water passing through the exchanger.

2. A system as in claim 1, including a return water line connected to the inlet side of the circulator means.

3. A system as in claim 1, wherein said controlling means is responsive to temperature of water entering the heat exchanger.

4. A hot water heating system adapted for supplying relatively high temperature water for sanitary use at substantially constant temperature, comprising a heat exchanger having a limited volumetric capacity, a heat source for applying heat to the heat exchanger, and an accumulator tank for hot water separate from the heat exchanger, circulator means for maintaining a flow of water in a primary loop which includes the said heat exchanger and a part, at least, of said accumulator tank, a water distribution loop connected to said accumulator tank to receive relatively high temperature water therefrom, the said primary loop in effect, having a bypass relationship with the distribution loop, a source of cold water connected directly to the inlet of the heat exchanger, and means for controlling the heat source in response to water temperature at the heat exchanger whereby upon a demand for water from the accumulator tank the heat source responds so as to maintain the temperature of water supplied.

5. A system as in claim 4, wherein the temperature-responsive means is positioned to be responsive to water entering the inlet to the heat exchanger to provide for immediate response to load demands.

6. A system as in claim 4, wherein said controlling means is constructed to modulatingly control the heat source.

7. A system as in claim 4, wherein said circulator means is positioned to pump out of the tank and into the heat exchanger.

8. A system as in claim 4, wherein means are provided to normally maintain said circulator in continuous operation.

9. A system as in claim 4, including means responsive to flow in the said primary loop for causing the heat source to operate.

10. A system as in claim 4, including a further distribution loop connected to said accumulator tank to receive water therefrom at a lower temperature and means comprising a temperature-responsive valve for controlling the supply of heated water to the said further distribution loop.

11. A system as in claim 4, wherein said accumulator tank is of relatively small volumetric capacity sufficient to accommodate demands for relatively higher temperature water.

12. A system as in claim 11, wherein said control means is constructed to modulatingly control said heat source.

13. A hot water system comprising a heat exchanger of limited volumetric capacity and having a water supply inlet and a service outlet, a heat source for heat to said heat exchanger, a storage tank spaced from the heat exchanger and bypass means including at least a part of the storage tank, pump means for maintaining a substantially uniform velocity recirculating flow of water through said heat exchanger and said bypass means from the heat exchanger outlet to said inlet at all heating loads, said heat exchanger having a construction providing elongated passageway means for the water of a size and configuration to provide a continuous rate of flow comparable to that in the bypass, the heat source being constructed to supply heat along the length of the elongated passageway means such that with the rate of flow of water therethrough, the heat exchanger is capable of transferring heat to the water at a rate necessary to meet instantaneous service demands over a wide range, means for recirculating water through the heat exchanger at a rate necessary to meet service load demands, and means for controlling the heat source in response to temperature at the heat exchanger.

14. A system as in claim 13, wherein said pump means is in the bypass in a position to circulate water from the tank to the heat exchanger.

15. A system as in claim 13, including a flow responsive device responsive to recirculating flow through said heat exchanger for controlling said heat source.

16. A system as in claim 13, wherein said controlling means is constructed to modulatingly control the heat source.

17. A system as in claim 13, wherein the controlling means is responsive to temperature of water entering the heat exchanger.